INVENTOR
GEORGE J. EHNI III

BY
ATTORNEY

INVENTOR
GEORGE J. EHNI III

BY

ATTORNEY

United States Patent Office 3,440,442
Patented Apr. 22, 1969

3,440,442
FREQUENCY THRESHOLD SENSITIVE CIRCUIT
George J. Ehni III, Dallas, Tex., assignor to Beta
Corporation, a corporation of Texas
Filed Oct. 7, 1965, Ser. No. 493,695
Int. Cl. H03k 5/20
U.S. Cl. 307—233         5 Claims

ABSTRACT OF THE DISCLOSURE

A frequency threshold sensitive circuit including a bistable circuit which generates first and second series of signals, each having a frequency which is a function of the frequency of the input signal, a monostable circuit which generates a third signal of a duration not greater than a period of a threshold frequency in response to signals from the first series of signals, an "AND" gate responsive to coincidence between the third signal and signals of the second series for providing an output signal indicating that the frequency of the input signals has become equal to a threshold frequency in combination with a pair of silicon controlled rectifiers, one of which is switched on when the "AND" gate provides an output and the other of which is switched on in the absence of an output from the "AND" gate subsequent to the first silicon controlled rectifier being switched on.

---

Apparatus is often required for indicating that a signal has attained a desired threshold level. For example, in many types of turbine controls, various operations are performed as a function of the speed of the turbine. The speed of the turbine can suitably be indicated by a transducer which produces a number of electrical pulses related to the speed of the turbine.

In accordance with the principles of the present invention, there is provided means for generating first and second series of signals having a frequency which is a function of the frequency of the input signals. There is also provided discrimination means having first and second inputs, and means for applying the first and second series signals generated by the generating means to the first and second inputs, respectively. The discriminating means is operative to generate a signal of a fixed duration equal to the period of the threshold frequency responsive to the application of one of the signals to its first input and also includes means responsive to application of one of the second series of signals to its second input while a signal of fixed duration is present for providing a signal indicative of occurrence of a threshold frequency.

In accordance with the preferred embodiment of the invention, the signal derived from a transducer or other suitable source is applied to the input of a Schmitt trigger circuit. The output of the Schmitt trigger circuit is in turn applied to the input of a conventional bistable multivibrator having two outputs. As each input is applied to the Schmitt trigger, the Schmitt trigger will produce a signal to cause the bistable multivibrator to switch states. The output of the bistable multivibrator will therefore be first and second series of signals each of a frequency one-half that of the input signals. The frequency discrimination circuit itself suitably comprises a one shot or similar circuitry capable of producing an output pulse having a fixed duration equal to the period of the desired threshold frequency. One of the outputs of the multivibrator is connected to the input of the one shot.

There is also provided a coincidence indicating means capable of providing an output signal upon coincidence of two signals applied thereto. In accordance with the preferred embodiment of the invention, the coincidence indicating means is a transistor which functions as an "AND" circuit. The output of the one shot is applied to the base of the transistor and the second output of the multivibrator being applied to the collector of the transistor, the emitter of the transistor being connected to ground through the load. Thus, if a signal is applied to the transistor from only one of the one shot or the multivibrator, the transistor will not be conductive. However, if a signal is applied to the collector of the transistor from the multivibrator while a signal is applied to the base of the transistor from the one shot, the transistor will become conductive and remain conductive so long as the two signals are present. It will be noted that the coincidence means will be actuated at any time that the frequency of the input signals is in excess of the desired threshold level.

In accordance with one preferred example of the present invention, switching means is actuated responsive to the threshold level being attained to thereafter provide a constant indication that the threshold level has been attained even though the frequency of the input signal should thereafter fall below the threshold frequency. In accordance with still a second embodiment of the invention, the output of the coincidence means is amplified, but an indication of the threshold level is provided only so long as the frequency of the input signals is at least equal to the threshold level. In accordance with still a third embodiment of the invention, one indication is provided when threshold frequency is passed with the frequency of the input signals increasing from a frequency less than the threshold frequency to a frequency greater than the threshold frequency, and still a second signal is provided as the frequency of the input signals passes through the threshold frequency with the frequency decreasing from a frequency in excess of the threshold level to a frequency less than the threshold level.

Many objects and advantages of the present invention will become readily apparent to those skilled in the art as the following detailed description of a preferred embodiment of the same unfolds when taken in conjunction with the appended drawings wherein like reference numerals denote like parts and in which.

Figure 3:
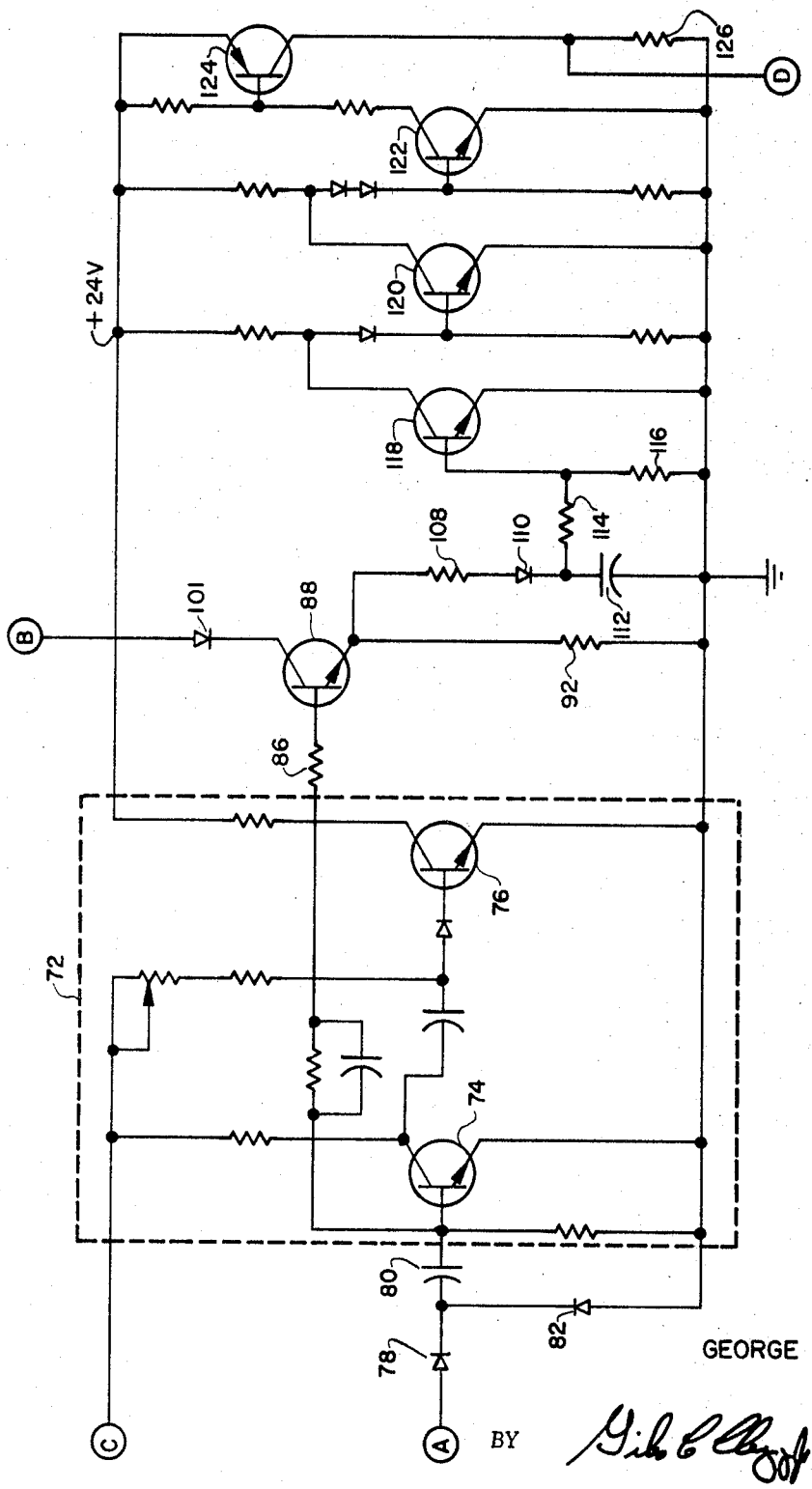
Figure 4:
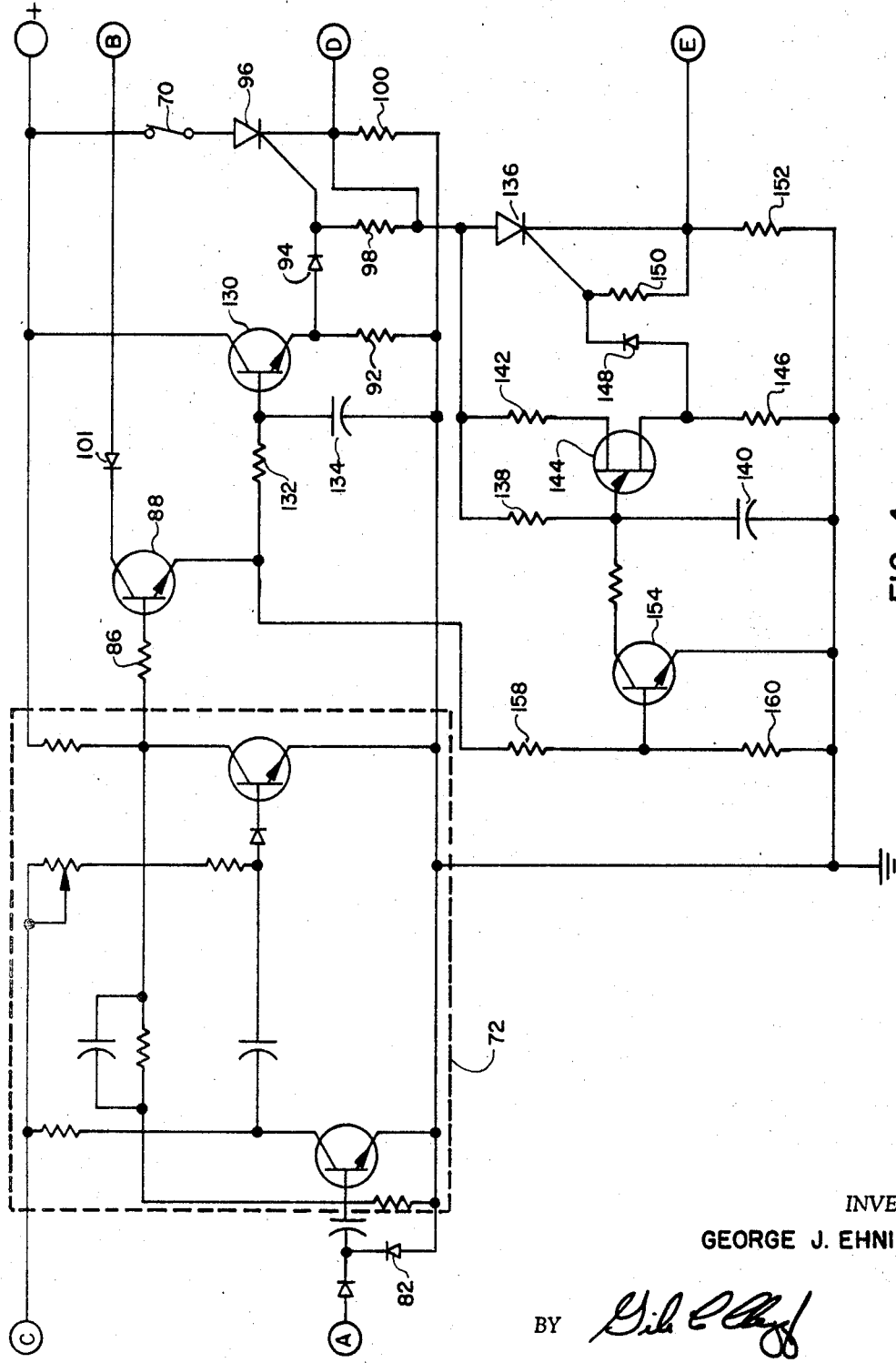
Figure 5:
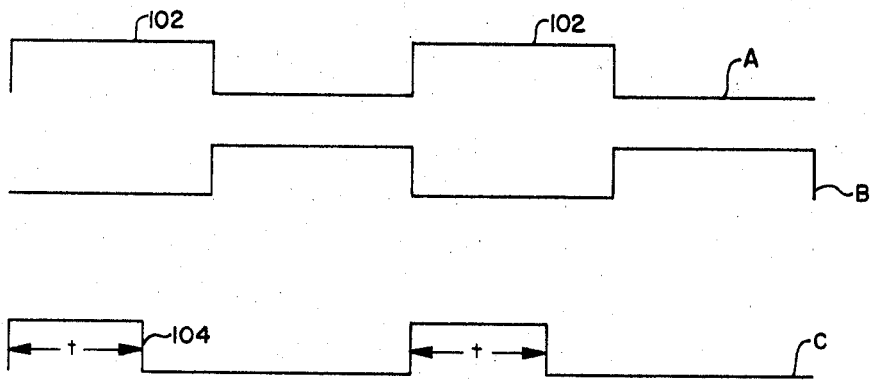
Figure 6:
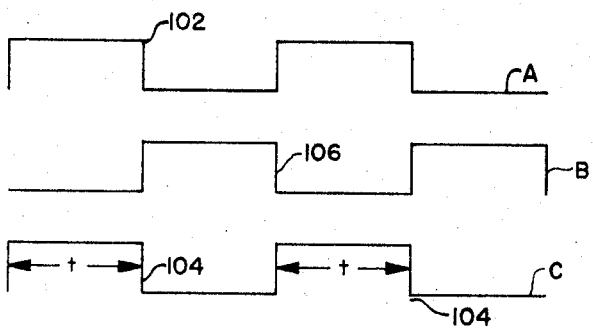
Figure 7:
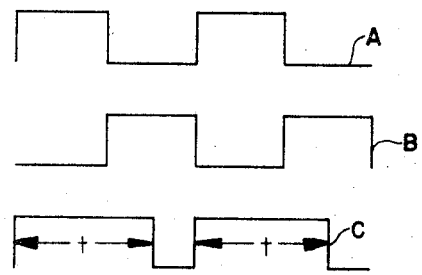

FIGURE 3 is a schematic diagram of a frequency discrimination circuit of the present invention wherein an output signal indicating attainment of the threshold frequency is provided only so long as the input signal is in excess of the desired threshold frequency; and FIGURE 4 is a schematic diagram illustrating still a third embodiment of a frequency discrimination circuit in accordance with the present invention wherein there is provided means for producing an output signal indicating that the input signal has increased to a frequency above the threshold frequency and also providing a second signal to indicate that thereafter the signal has decreased to a frequency below the threshold level; and FIGURES 5–7 are curves illustrating the time relationship between various signals produced by the circuit of the preferred embodiment of the invention.

Figure 1:
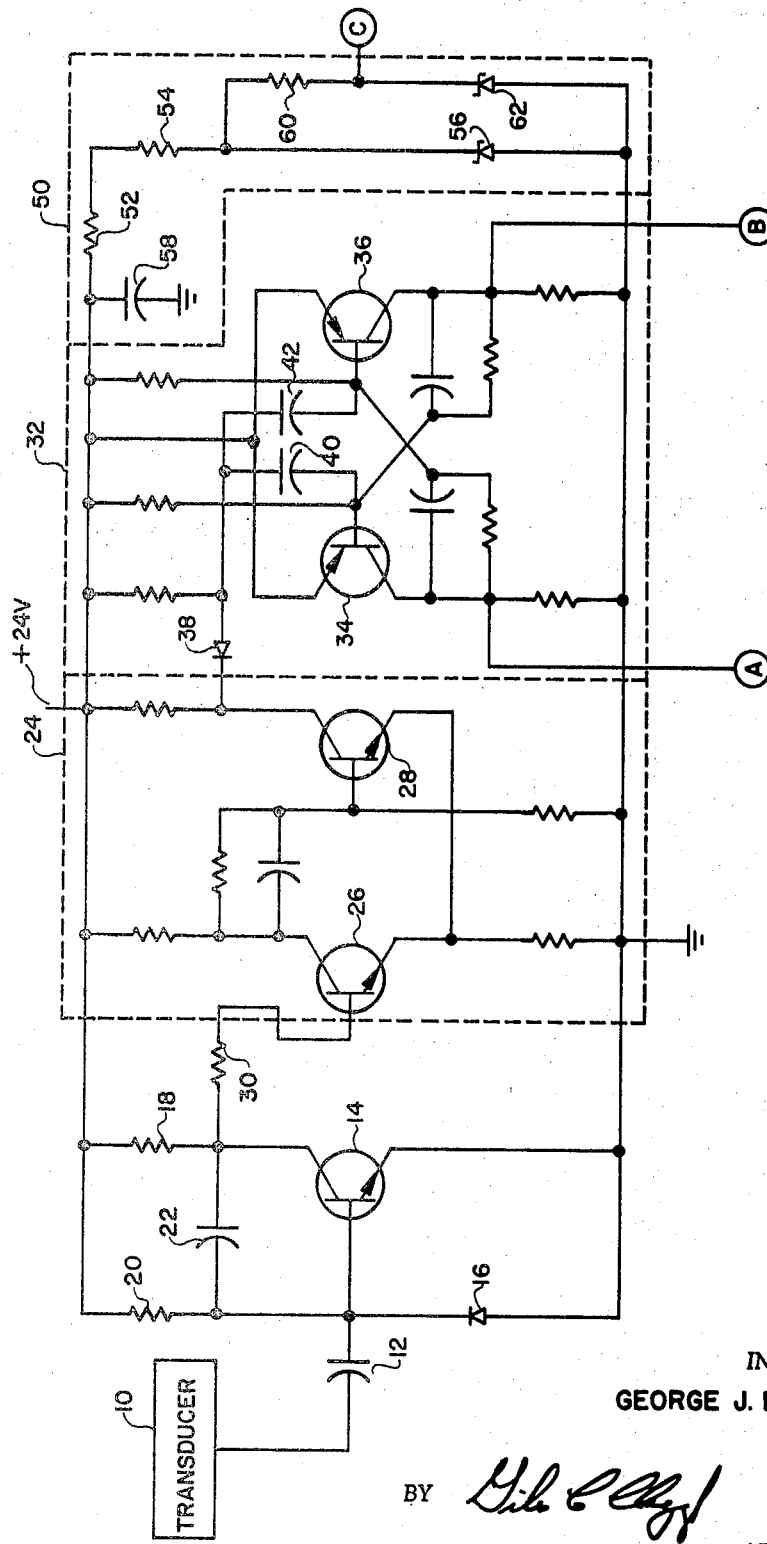
FIGURE 1 is a schematic diagram illustrating a Schmitt trigger and a bistable multivibrator connected for producing first and second outputs each of a frequency related to the frequency of an input signal.

Turning now to FIGURE 1 of the drawings, the output of transducer 10 is applied through capacitor 12 to the base of a transistor 14. In accordance with the preferred embodiment of the invention to be described, transducer 10 produces three signals responsive to each rotation of a shaft of a turbine. However, it will be appreciated that the signals applied to the transistor 14 may be generated by any means from which it is possible to derive the information. The base of the transistor 14 is connected to the cathode of diode 16, the anode of the diode 16 being connected to the emitter of transistor 14 and to ground. Diode 16 and transistor 14 are both suitably silicon semiconductor devices and the voltage applied to the base of the transistor will swing between −0.7 volt to approximately +0.7 volt. Conduction through the base-emitter diode of the transistor 14 and through the diode 16 will produce clipping of the input signal above these levels. The collector of transistor 14 is connected through resistor 18 to a source of supply voltage, suitable +24 volts. The base of the transistor 14 is connected through resistor 20 to +24 volts and through capacitor 22 to the collector of transistor 14. The transistor 14 is therefore biased to become conductive each time a positive going signal is applied to its base through capacitor 12.

There is also provided a Schmitt trigger circuit 24 comprising transistor 26 and transistor 28. The collector of transistor 14 is connected through resistor 30 to the base of transistor 26. There is also provided a bistable multivibrator 32 comprising transistor 34 and transistor 36. The collector of transistor 28 is connected to the cathode of coupling diode 38, the anode of diode 38 being connected through capacitor 40 to the base of transistor 34 and through capacitor 42 to the base of transistor 36. The collector of transistor 34 is connected to output terminal A and the collector of transistor 36 is connected to output terminal B.

As mentioned previously, multivibrator 32 is of conventional type in which only one of the two transistors 34 or 36 will be conductive at any particular time. If transistor 34 is conductive, a positive signal will appear at output terminal A. On the other hand, if transistor 36 is conductive, a positive output signal will appear at terminal B. The conductive state of the multivibrator 32 will change each time a negative going pulse is applied through capacitors 40 and 42 to the base of transistors 34 and 36. The multivibrator will therefore change state only when the output of the Schmitt trigger goes negative.

In operation of the circuit shown in FIGURE 1, each time a signal is received from transducer 10, the transistor 14 will become more highly conductive, causing the collector of transistor 14 to become less positive. As the collector of transistor 14 becomes less positive, transistor 26 will become less conductive, causing the collector of transistor 26 to become more positive. As the collector of transistor 26 becomes more positive, the transistor 28 will be driven into conduction, causing the collector of transistor 28 to become more negative. Due to the amplification of the signal from the transducer 10 by transistor 26, even a small signal from the transducer 10 will cause transistor 28 to be driven rapidly into saturation, causing the signal produced at the collector of transistor 28 to decrease very rapidly, the amount of decrease being substantial. The negative going signal produced at the output of the Schmitt trigger 24 (collector of transistor 28) is applied through the coupling diode 38 and capacitors 40 and 42 to the bases of transistors 34 and 36, respectively, causing the multivibrator 32 to switch states. The multivibrator 32 will therefore produce two series of output signals, each being of a frequency which is a function of the frequency of the input signal from the transducer 10. In accordance with one specific example of the invention, the frequency of the signals produced at the two outputs of the multivibrator 32 is of a frequency one-half the repetition rate. If the transducer 10 is coupled to the shaft of a turbine or similar device of which it is desired to determine the speed, and by providing a transducer which produces a fixed number of output signals responsive to each rotation of the shaft, the frequency of each of the two series of output signals produced by the multivibrator will be a function of the speed of the rotating shaft.

Also shown in FIGURE 1 of the drawings is a circuit designated generally by the reference character 50 for producing an output terminal C, a precision regulated voltage which is compensated for changes in temperature. The circuit 50 can be seen to comprise a series circuit comprising resistor 54 and a Zener diode 56 which is connected between a source of +24 volts and ground. The juncture between resistor 54 and diode 56 is connected through a second series circuit comprising resistor 60 and Zener diode 62 in parallel with Zener diode 56. Output terminal C is connected to the juncture between resistor 60 and diode 62. Zener diode 62 is of the type which is temperature compensated such that the voltage appearing at terminal C will be of a constant level and remain constant with changes in temperature and variations in the supply voltage. It will be noted that the diode 56 effectively maintains the voltage applied to resistor 60 and diode 62 constant with variation in supply voltage and that diode 62 primarily functions as a temperature compensating element.

Figure 2:
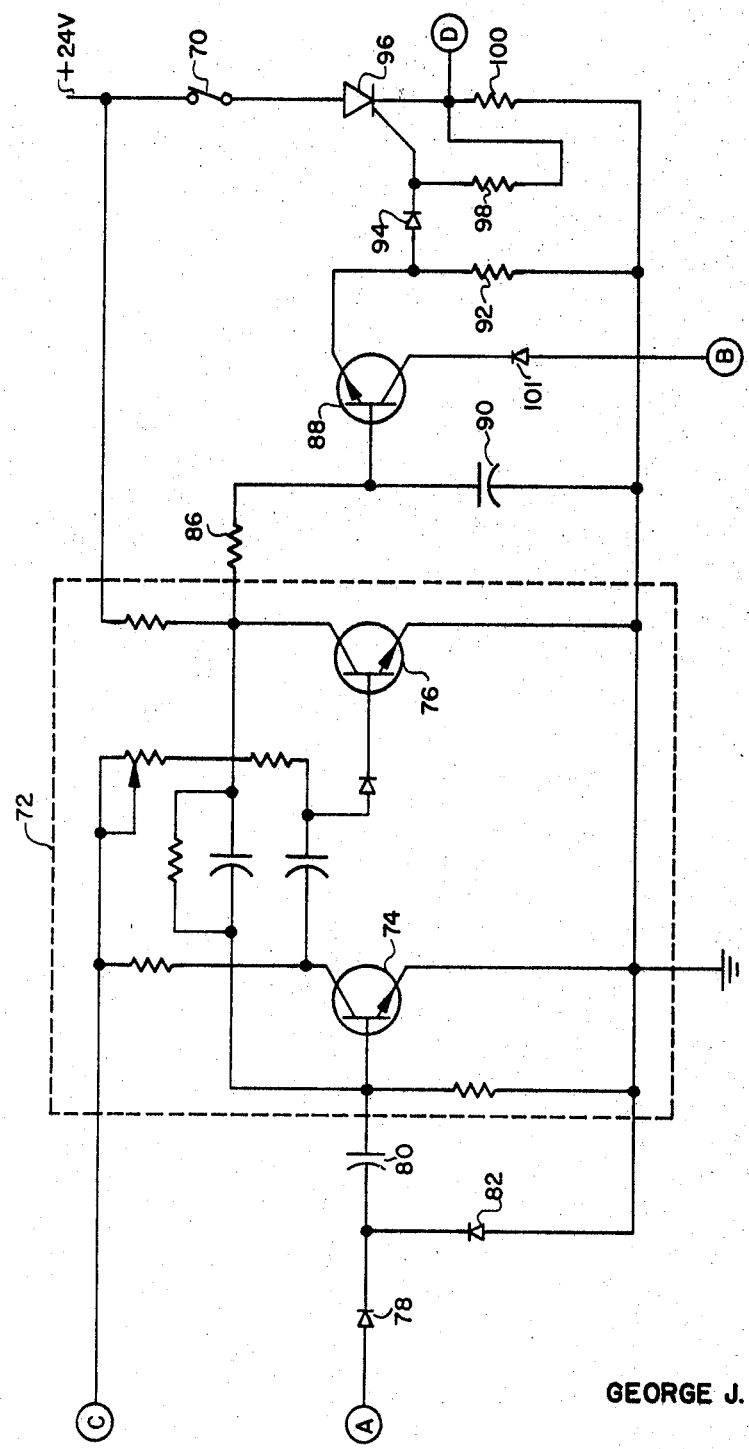
FIGURE 2 is a schematic diagram illustrating a frequency discrimination circuit of the present invention wherein an output indicating attainment of the threshold frequency is provided without regard as to whether frequency of the input signal remains in excess of the threshold level.

Turning now to FIGURE 2 of the drawings, there is shown one example of a frequency discrimination circuit provided by the present invention wherein there is provided an output voltage at terminal D responsive to the frequency of the signals produced by the transducer 10 increasing to a level at least equal to the threshold frequency and in which the output signal at terminal D is maintained thereafter until the circuit is reset, suitably by opening normally closed switch 70.

The circuit of FIGURE 2 can be seen to comprise a one shot, designated generally by the reference character 72 which includes a transistor 74 and a transistor 76. Terminal A of the multivibrator 32 is connected to the anode of diode 78, the cathode of diode 78 is connected through coupling capacitor 80 to the base of transistor 74. The cathode of diode 78 is also connected through resistor 82 to ground.

When a positive going pulse appears at terminal A of the multivibrator, the diode 78 will be forward biased, permitting the pulse to pass. The positive going leading edge of the pulse will be differentiated by capacitor 80 and applied to the base of transistor 74 as a positive going pulse which causes the transistor 74 to momentarily be biased on. Once the transistor 74 is biased on, it will be maintained in the conductive state by current flowing from the collector of transistor 76 until transistor 76 becomes conductive after a period of time equal to the period of the desired threshold frequency. If the pulse appearing at terminal A of the multivibrator should end prior to the end of the pulse produced by the one shot, the diode 78 will become back biased, preventing rapid discharge of the capacitor 80, and capacitor 80 will only discharge through the path comprising the resistor 82. The relatively slow discharge of the capacitor 80 through resistor 82 will prevent application of a fast rising, negative going pulse to the base of transistor 74 with the resultant possibility of turning transistor 74 off prior to the desired time, thereby insuring that the length of the pulse produced by the multivibrator will not interfere with operation of the one shot.

Terminal C of the precision voltage supply circuit is connected for supplying B+ power to transistor 74 and also to a resistance capacitance network which determines the width of the pulse produced by the one shot 72 in response to a signal appearing at output terminal A of the multivibrator 32. The provision of the precision voltage which is supplied to terminal C in conjunction with matching of components insures that the width of a pulse produced by the one shot will remain constant with changes in the +24 volt supply voltage and temperature.

The output of the one shot 72 appears at the collector of transistor 76. Thus, each time a positive signal appears at terminal A, the transistor 76 will be biased off for a precise time interval, producing a positive going pulse of precise duration which is a function of the period of the desired threshold frequency. Thus, for example, if it is desired to produce a signal at terminal D when the shaft of a turbine attains a speed of 31,200 r.p.m., and if the transducer produces three pulses for each revolution of the shaft, it can be shown that 1,560 pulses will be produced per second. The period of a signal having a frequency of 1,560 pulses per second is 0.641 millisecond. The one shot 72 is suitably designed such that the period of each of the pulses produced by the one shot will be precisely equal to 0.641 millisecond.

The output of the one shot 72 is applied through resistor 86 to the base of transistor 88, the base of transistor 88 also being connected through capacitor 90 to ground. The emitter of transistor 88 is connected through resistor 92 to ground, the juncture between the emitter of transistor 88 also being connected to the anode of diode 94. The cathode of diode 94 is connected to the gate electrode of silicon controlled rectifier 96. The gate electrode of silicon controlled rectifier 96 is connected through resistor 98 to its cathode. The cathode of silicon controlled rectifier 96 is connected to output terminal D and through resistor 100 to ground. The anode of silicon controlled rectifier 96 is connected to +24 volts, suitably through normally closed switch 70.

The collector of transistor 88 is connected to the cathode of diode 101, whose anode is connected to output terminal B of multivibrator 32. Thus, if the multivibrator 32 provides an output voltage at terminal B, which is applied to the collector of transistor 88, and if, at the same time, the one shot 72 provides an output voltage which is applied to the base of transistor 88, transistor 88 will become conductive. When transistor 88 conducts, current will flow through diode 94, applying a control signal to the gate of silicon controlled rectifier 96 to cause it to switch from its normally high impedance state to a quasi stable low impedance state in which the silicon controlled rectifier 96 will remain so long as holding current flows through its anode and cathode electrodes. When the silicon controlled rectifier 96 switches to a low impedance state, current will flow through resistor 100, causing an output voltage to appear at terminal D, indicating that the threshold frequency has been attained. The silicon controlled rectifier 96 will thereafter remain in its low impedance state until the flow of current through its anode and cathode electrodes is interrupted, suitable by opening the switch 70.

The operation of the circuitry can perhaps best be understood in conjunction with curves of FIGURES 5, 6 and 7, wherein curve A of each of the figures shows the signal appearing at output A of the multivibrator 32, curve B represents the signal appearing at output B of multivibrator 32 and curve C illustrates the output of the one shot 72. Thus, as illustrated in FIGURE 5, so long as pulses 102 comprising curve A are of a width greater than the width of the pulses 104 produced by the one shot 72, potentials will not be applied simultaneously to the base and collector of transistor 88, indicating that the frequency of the input signals is less than the desired threshold frequency. As the frequency of the input signal increases, the width of the pulses 102 will decrease, and when the frequency of the input pulses becomes equal to or slightly greater than the threshold frequency, as illustrated in FIGURE 6, pulses 106 produced at the output B of multivibrator 32 will appear while pulses 104 are still present, momentarily biasing transistor 88 on, in turn causing silicon controlled rectifier 96 to be biased on to switch to the low impedance state to produce an output at terminal D. FIGURE 7 illustrates the relationship between curves A, B and C when the frequency of the input signal is greater than the desired threshold frequency. Thus, curve B will remain of the same character with each of the pulses 104 remaining of fixed duration. However, the conduction time of transistor 88 will increase as pulses 104 and 106 will be in coincidence for a greater period of time.

Turning now to FIGURE 3 of the drawings there is shown an embodiment of the invention wherein an output indicative of the input signal frequency being at least equal to or greater than the threshold frequency will be present only so long as the input frequency remains equal to or greater than the threshold frequency. It can be seen that the circuit of FIGURE 3 is substantially the same as the circuit of FIGURE 2 insofar as the connections to the one shot 72 and the transistor 88 are concerned. However, the emitter of transistor 88 is connected through resistor 108 to the anode of diode 110, the cathode of diode 110 being connected through capacitor 112 to ground. The juncture between diode 110 and capacitor 112 is connected through resistors 114 and 116 to ground, with the juncture between resistors 114 and 116 being connected to the base of transistor 118. Transistors 118, 120, 122 and 124 are connected as a current amplifier. It will also be seen that the transistor 124 is suitably of the p-n-p type whereas transistors 118, 120 and 122 are all suitably of the n-p-n type. The collector of transistor 124 is connected through load resistor 126 to ground such that when transistor 124 is rendered conductive, an output will appear at terminal D connected to the juncture between the collector of transistor 124 and load resistor 126.

Each time that the transistor 88 is biased to its conductives state, current will flow to charge the capacitor 112 through a circuit comprising the emitter-collector circuit of transistor 88, resistor 108 and diode 110. After several cycles, the capacitor 112 will become charged sufficiently to bias transistor 118 on. When transistor 118 is biased on, transistor 120 will be biased to a less conductive state. As transistor 120 is biased to a less conductive state, a signal is applied to bias transistor 122 on. As transistor 122 is biased on, it will also bias transistor 124 on, causing current to flow through resistor 126 in the emitter-collector circuit of transistor 124 and producing an output at terminal D. Thereafter, so long as the resistor 88 is biased to its conductive state in each cycle of the input signals, capacitor 112 will remain charged, biasing transistor 118 on and so causing transistor 124 to be maintained continuously on. However, upon the input signal falling below the threshold frequency, transistor 88 will no longer be biased on each cycle of the input signal and after a short period of time the capacitor 112 will become sufficiently discharged that transistor 118 will not be biased on. When transistor 118 turns off, transistor 124 will also turn off and a signal will not appear at output terminal D.

Turning now to FIGURE 4, of the drawings, there is illustrated still a third embodiment of the invention wherein provision is made for providing one output signal as the input signal increases to a frequency above the threshold frequency and thereafter providing still a second output signal to indicate that the input signal has decreased to a frequency below the threshold frequency. It can readily be seen that the circuit of FIGURE 4 is similar in many respects to that of FIGURE 2 and that the input to the one shot 72 is the same and the output is similarly coupled to the base of transistor 88 by resistor 86, with the collector of transistor 88 being connected to terminal B of the multivibrator 32.

Also, there is provided the silicon controlled rectifier 96 which is connected between the supply voltage and ground by switch 70 and load resistor 100, with output D being connected between the cathode of silicon controlled rectifier 96 and load resistor 100. The circuit for biasing the silicon controlled rectifier on is also as described with reference to FIGURE 2 in that it comprises resistor 92, diode 94 and resistor 98. However, the juncture between resistor 92 and diode 94 are connected to the emitter of a transistor 130 rather than to the emitter of transistor 88. The collector of transistor 130 is connected to +24 volts supply voltage, the base of transistor 130 being connected to the emitter of transistor 88 through resistor 132. The base of transistor 130 is also connected through capacitor 134 to ground. Thus, at such time as the frequency of the input signal has increased to the threshold frequency, the transistor 88 will be biased on momentarily, permitting current to flow through its emitter-collector circuit, resistor 132 and capacitor 134. When transistor 130 is biased to a conductive state as a result of current flow in the emitter-collector circuit of transistor 88, voltage will be developed across resistor 92 to cause the silicon controlled rectifier 96 to switch to its low impedance state. When the silicon controlled rectifier 96 switches to its low impedance state, voltage will be developed across resistor 100 which appears at terminal D, indicating that threshold frequency has been attained.

It will be noted that the voltage appearing across resistor 100 will also be applied to the anode of silicon controlled rectifier 136, but prior to conduction to silicon controlled rectifier 96, voltage will not be applied to the anode of silicon controlled rectifier 136. The anode of silicon controlled rectifier 136 is connected to ground through resistor 138 and capacitor 140. The anode of silicon controlled rectifier 136 is also connected to ground through a second series path comprising resistor 142, the two bases of unijunction transistor 144 and resistor 146. The juncture between the unijunction transistor 144 and resistor 146 is connected to the anode of diode 148, the cathode of diode 148 being connected to the gate electrode of silicon controlled rectifier 136. The gate electrode of silicon controlled rectifier 136 is also connected to ground through a series circuit comprising resistor 150 and resistor 152. The juncture between resistors 150 and 152 is connected to output terminal E and to the cathode of silicon controlled rectifier 136. There is also provided transistor 154 whose emitter is connected to ground and whose collector is connected through resistor 156 to the juncture between resistor 138 and capacitor 140 and to the emitter of the unijunction transistor 144. The emitter of transistor 88 is connected through resistors 158 and 160 to ground, with the juncture between resistors 158 and 160 being connected to the base of transistor 154.

Each time that the transistor 88 is biased to its conductive state, current will flow through resistors 158 and 160 to apply a voltage to the base of transistor 154 to turn the transistor 154 on, with the transistor 154 remaining on so long as transistor 88 remains conductive. When transistor 154 is conductive, it will provide a low resistance discharge path for capacitor 140 through resistor 156 and the emitter-collector circuit of transistor 154. Thus, although a charge path will be provided for capacitor 140 through resistor 138 from the cathode of silicon controlled rectifier 96 upon silicon controlled rectifier 96 being switched to the low impedance state, so long as the frequency of the input signal is in excess of the threshold frequency, the periodic conduction of transistor 154 will maintain capacitor 140 in a substantially discharged state. However, if the frequency of the input signals should fall below the threshold frequency, transistor 154 will not be rendered conductive and capacitor 140 will be charged. When the capacitor 140 becomes charged sufficiently, the unijunction transistor 144 will become biased by the capacitor 144 and the voltage applied to the base 1 and base 2 electrodes of unijunction 144 to cause the unijunction to switch to its low impedance state and to permit discharge of capacitor 140 through the emitter-base circuit of the unijunction 144 and resistor 146. The current flowing through resistor 146 as a result of discharge of capacitor 140 will be applied through diode 148 to the gate electrode of silicon controlled rectifier 136, causing silicon controlled rectifier 136 to switch to the low impedance state. When silicon controlled rectifier 136 switches to the low impedance state, current will flow through the anode and cathode circuit and resistor 152, causing a signal to appear at output E, indicating that the frequency of the input signal has fallen below the threshold frequency. Thereafter, voltage will appear at outputs D and E until such time as the anode-cathode circuit of silicon controlled rectifier 96 and silicon controlled rectifier 136 is interrupted, suitably by opening switch 70.

From the foregoing, it will become readily apparent that the present invention provides an improved frequency threshold sensitive circuit. Although the invention has been described with regard to preferred embodiments thereof, many changes and modifications will become readily apparent to those skilled in the art in view of the foregoing description which is intended to be illustrative and not limiting of the invention defined in the appended claims.

What I claim is:
1. A frequency threshold sensitive circuit comprising:
  (a) means for generating first and second series of signals, each having a frequency which is a function of the frequency of an input signal;
  (b) frequency discrimination means having first and second input terminals; and
  (c) means for applying one of said series of signals to said first input terminal and for applying said second series of signals to said second input terminal;
  (d) said frequency discriminating means including:
    (1) means responsive to application of signal to said first input for generating a third signal of a duration not greater greater than the period of said threshold frequency;
    (2) a first silicon controlled rectifier;
    (3) an "AND" gate;
    (4) means connecting the output of said "AND" gate to a gate electrode of said silicon controlled rectifier;
    (5) means for applying said third signal to one of the inputs of said "AND" gate and said second series of signals to a second input of said "AND" gate;
    (6) a second silicon controlled rectifier;
    (7) means for applying to the anode and cathode electrode of said second silicon controlled rectifier biasing voltage responsive to the first silicon controlled rectifier being switched to a low impedance state;
    (8) means for generating and applying to a gate electrode of the second silicon controlled rectifier a control signal to cause the second silicon controlled rectifier to switch to the low impedance state; and
    (9) means responsive to an output from said "AND" gate for disabling said means for generating and applying a control signal.

2. A circuit as defined in claim 1 wherein said "AND" gate comprises a transistor, and means biasing said transistor to the conductive state responive to application of a signal to said second input during existence of said third signal.

3. A frequency threshold sensitive circuit as defined in claim 1 wheerin said means for generating first and second series of signals comprises a bistable multivibrator and means applying said input signal to cause said multivibrator to change states responsive to occurrence of each input signal.

4. A circuit as defined in claim 3 wherein said means for applying comprises a Schmitt trigger circuit.

5. A circuit as defined in claim 1 wherein said means responsive to application of a signal to said first input for generating a third signal of a duration not greater than the period of said threshold frequency comprises a one shot multivibrator.

References Cited

UNITED STATES PATENTS 3,184,606  5/1965  Ovenden et al. ____ 307—234 X

ARTHUR GAUSS, *Primary Examiner.*

J. D. FREW, *Assistant Examiner.*

U.S. Cl. X.R.

307—234; 328—109, 110, 133, 140